UNITED STATES PATENT OFFICE.

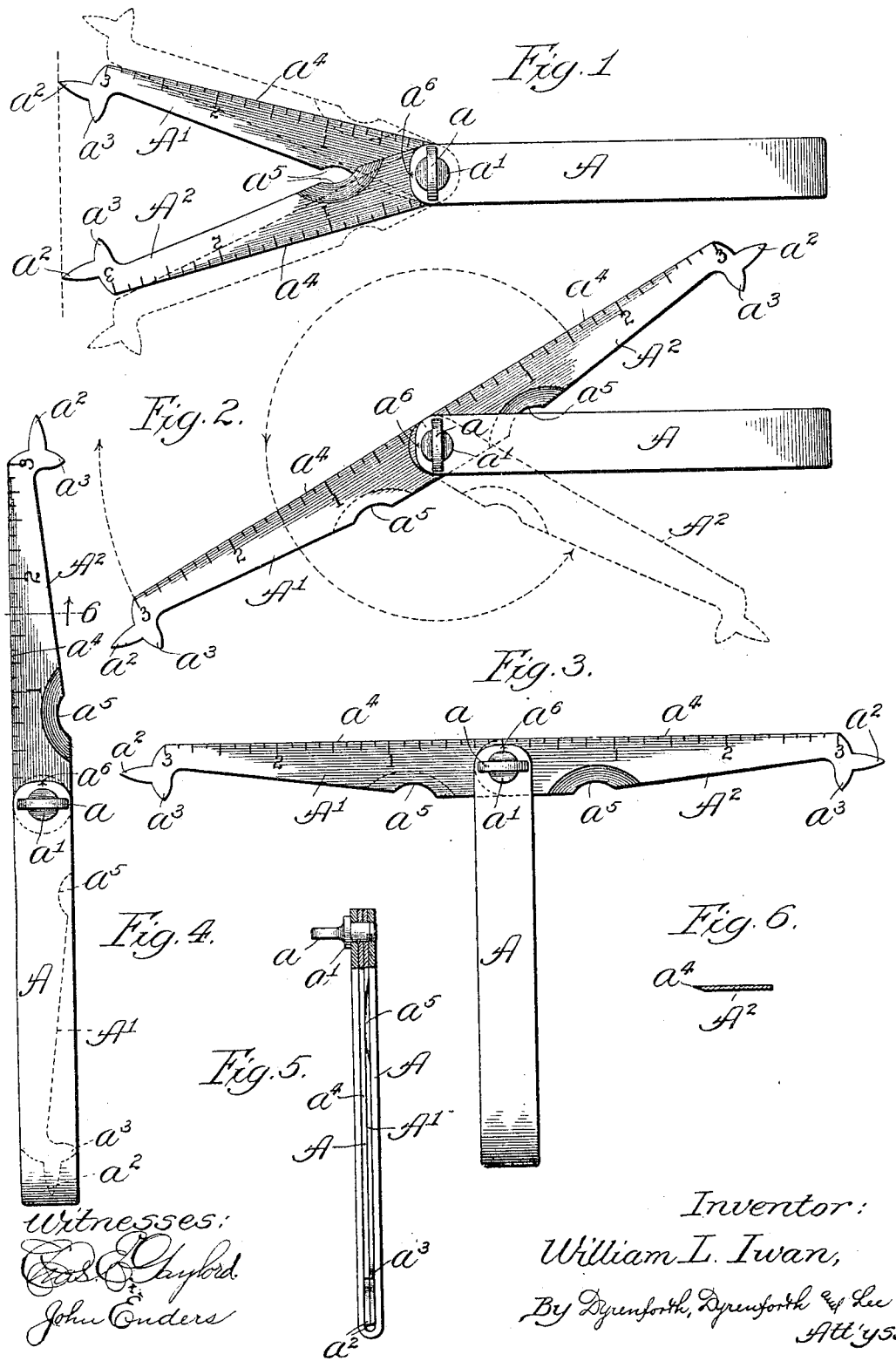

WILLIAM LOUIS IWAN, OF STREATOR, ILLINOIS.

COMBINATION IMPLEMENT.

No. 818,627. Specification of Letters Patent. Patented April 24, 1906

Application filed May 13, 1904. Serial No. 207,762.

*To all whom it may concern:*

Be it known that I, WILLIAM LOUIS IWAN, a citizen of the United States, residing at Streator, in the county of Lasalle and State of Illinois, have invented a new and useful Combination Implement, of which the following is a specification.

My invention relates to a combination implement convertible into different instruments, such as inside and outside calipers, dividers, rule, square, carpenter's bevel, paper-cutter, penknife, cigar-cutter, &c.

My primary object is to provide an implement of the character described capable of being cheaply manufactured and reliably used for the purposes indicated.

The invention is illustrated in the accompanying drawings, in which—

Figure 1 is a plan view of the implement in condition for use as a caliper, the full lines of the blades indicating the position for an outside caliper and the dotted lines thereof the position for an inside caliper; Fig. 2, a view illustrating the implement in condition for use as a bevel; Fig. 3, a view illustrating the implement in condition for use as a square and a rule; Fig. 4, a view illustrating the implement in condition for use as a paper-cutter and penknife; Fig. 5, an edge view of the implement in the closed condition, the device being here shown partly in section; and Fig. 6, a sectional view of the blade, taken as indicated at line 6 of Fig. 4.

In the preferred construction the implement comprises a handle or sheath A, comprising a strip of sheet-steel bent upon itself and blades A' A², having their base ends pivoted between the extremities of the strip of sheet metal forming the handle. The blades are pivotally secured by a set-screw $a$, having a shoulder $a'$ bearing upon one side of the handle and a threaded portion screwed into the opposite side or member of the handle. The blades are superposed, so that they may be swung to any desired position with relation to each other and with relation to the handle and then clamped firmly in that position. The blades terminate in divider-points $a^2$ and are provided adjacent to said points with oppositely-turned caliper-points $a^3$. Each blade has a straight edge $a^4$, which is suitably chamfered, forming a paper-cutting edge, and provided with a scale for lineal measuring purposes. At the edges of the blades opposite the straight edges and near the base of the blades are provided coöperating recesses $a^5$, whereat the blades are beveled on opposite sides, so as to swing the cutting edges adjacent to each other. This permits the blades to be employed when in the position shown in the full lines in Fig. 1 as a cigar-cutter, as is evident. The extremities of the U-shaped member constituting the handle have their corners rounded, and the upper one of said extremities is provided with a central mark $a^6$, which corresponds with the zero-mark of each of the two scales, as shown in Fig. 3.

A few of the uses to which the improved implement may be put may be mentioned. When the blades are in the position shown in the full lines in Fig. 1, the implement may be employed either as a divider or as an outside caliper. When the blades are in the position shown by the dotted lines in Fig. 1, the implement may be employed either as a divider or as an inside caliper. When the blades are in the position shown by the full lines in Fig. 2, the implement may be employed as a bevel and as a rule. When desired, the blade A² may be swung to the dotted position of Fig. 2 and the blade A' swung to the corresponding position on the opposite side of the handle, when the implement may be employed as a double bevel. When the blades are in the position shown in Fig. 3, the implement may be employed as a square and as a rule. When one of the blades is sheathed and the other extended, as shown in Fig. 4, the implement may be employed as a paper-cutter and as a penknife. When the blades are sheathed, as shown in Fig. 5, the implement may be carried readily and safely in the pocket.

Preferably the blades are of tempered steel and conveniently may be of a length of three to five inches, the handle being slightly longer to permit the blades to be readily sheathed. It will be understood, however, that the blade may be of any desired length and the handle of any desired construction.

Other uses than those specified may be found for the improved device. Moreover, changes in details of construction within the spirit of my invention may be made. Hence no undue limitation should be understood from the foregoing detailed description.

What I regard as new, and desire to secure by Letters Patent, is—

1. An implement of the character described, comprising a handle open at its lateral edges to sheathably receive blades, a clamping-screw, and superposed blades supported on said clamping-screw at one end of the handle and adapted to swing past each other, said blades having straight edges adapted to be brought into the same transverse plane and divider-points at their free extremities and lateral caliper-points adjacent to the divider-points at the edges opposite the straight edges, for the purpose set forth.

2. An implement of the character described, comprising a U-shaped handle, blades provided with divider-points and adjacent to said points with caliper-points, and a clamping-screw extending through a side member of the handle and through the base portions of the blades and into the opposite side member of the handle, for the purpose set forth.

WILLIAM LOUIS IWAN.

In presence of—
  H. N. RYON,
  OSCAR B. RYON.